May 30, 1961 A. M. DUMAN 2,985,950
METHOD OF MANUFACTURING COILS
Filed Feb. 6, 1959 5 Sheets-Sheet 1
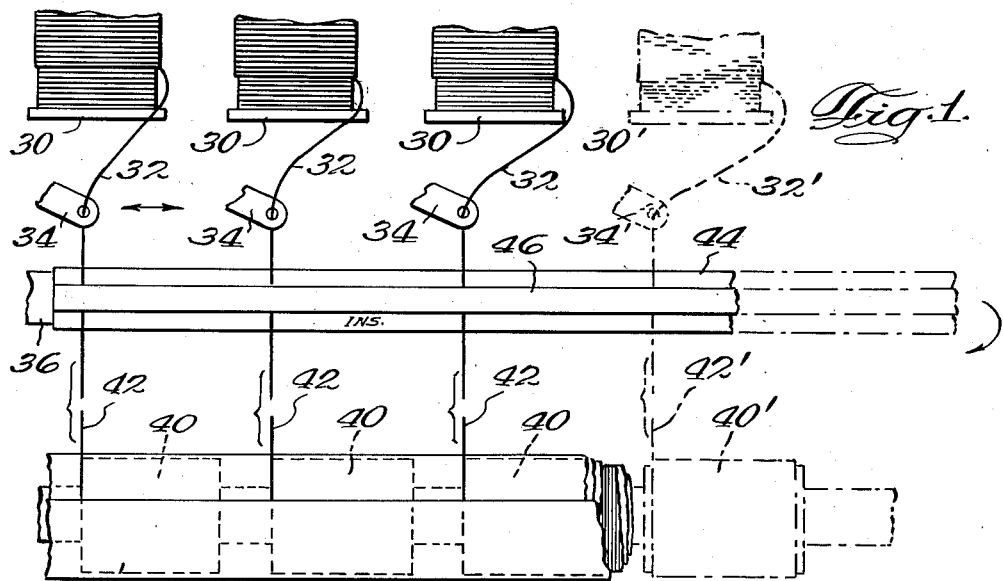
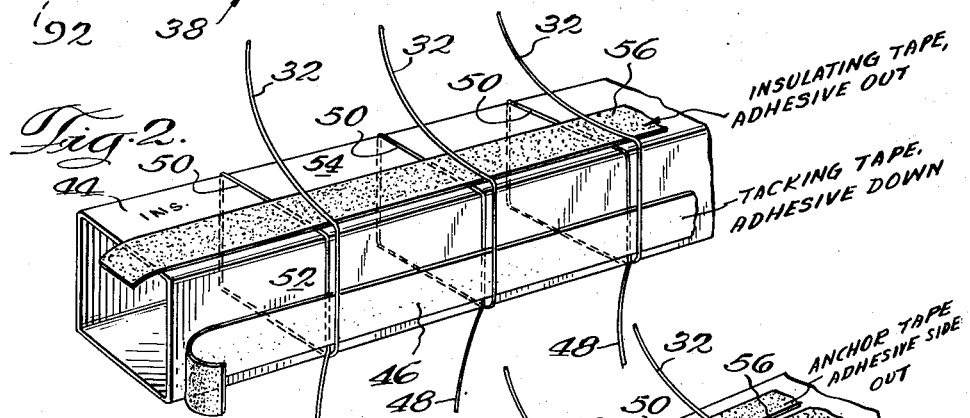
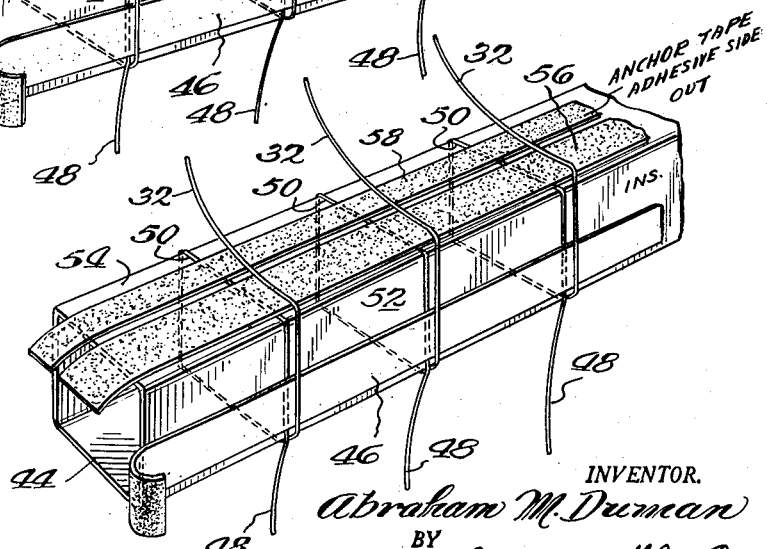
INVENTOR.
Abraham M. Duman
BY
Silverman, Mullin & Cass
Attorneys

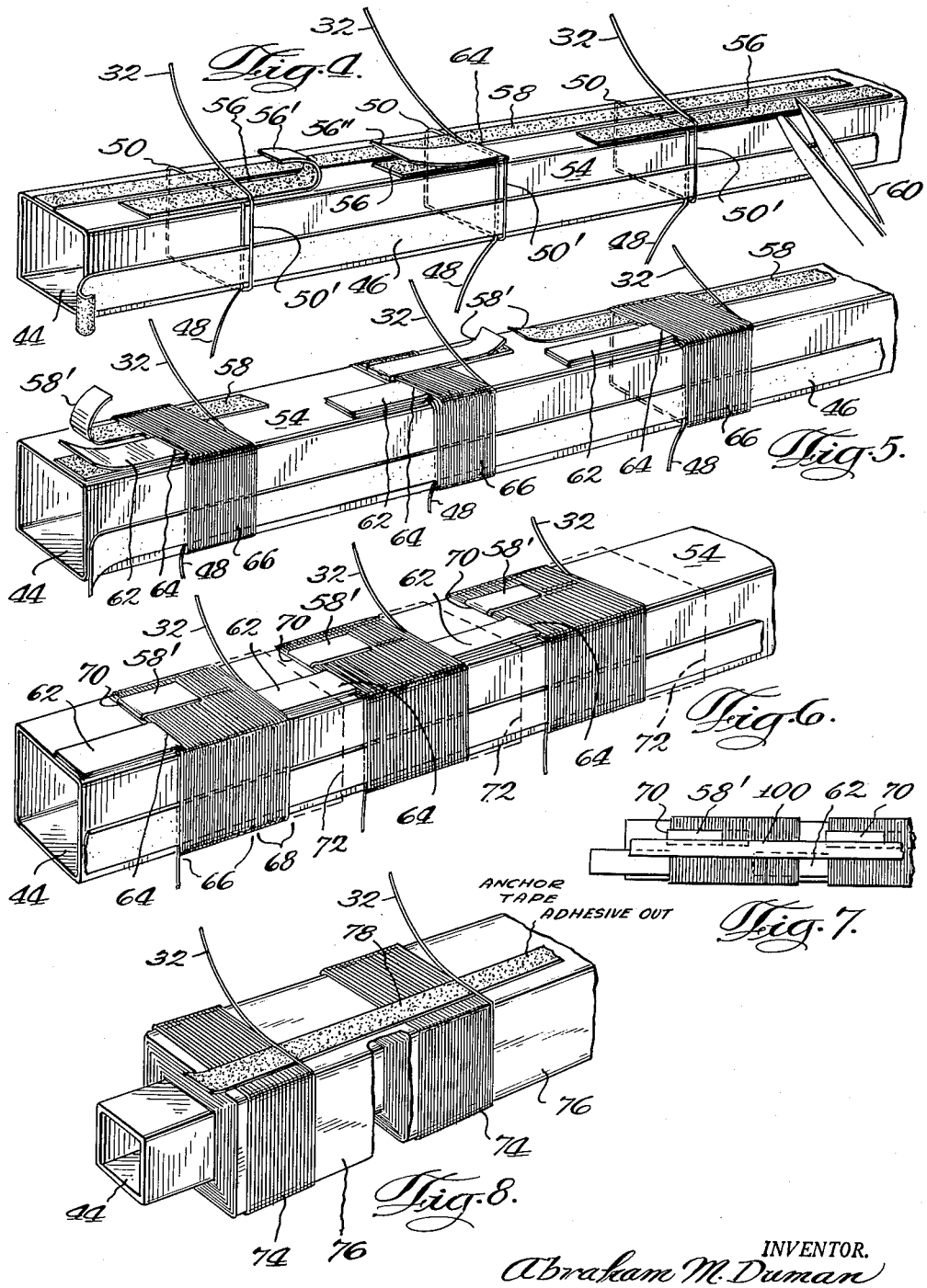

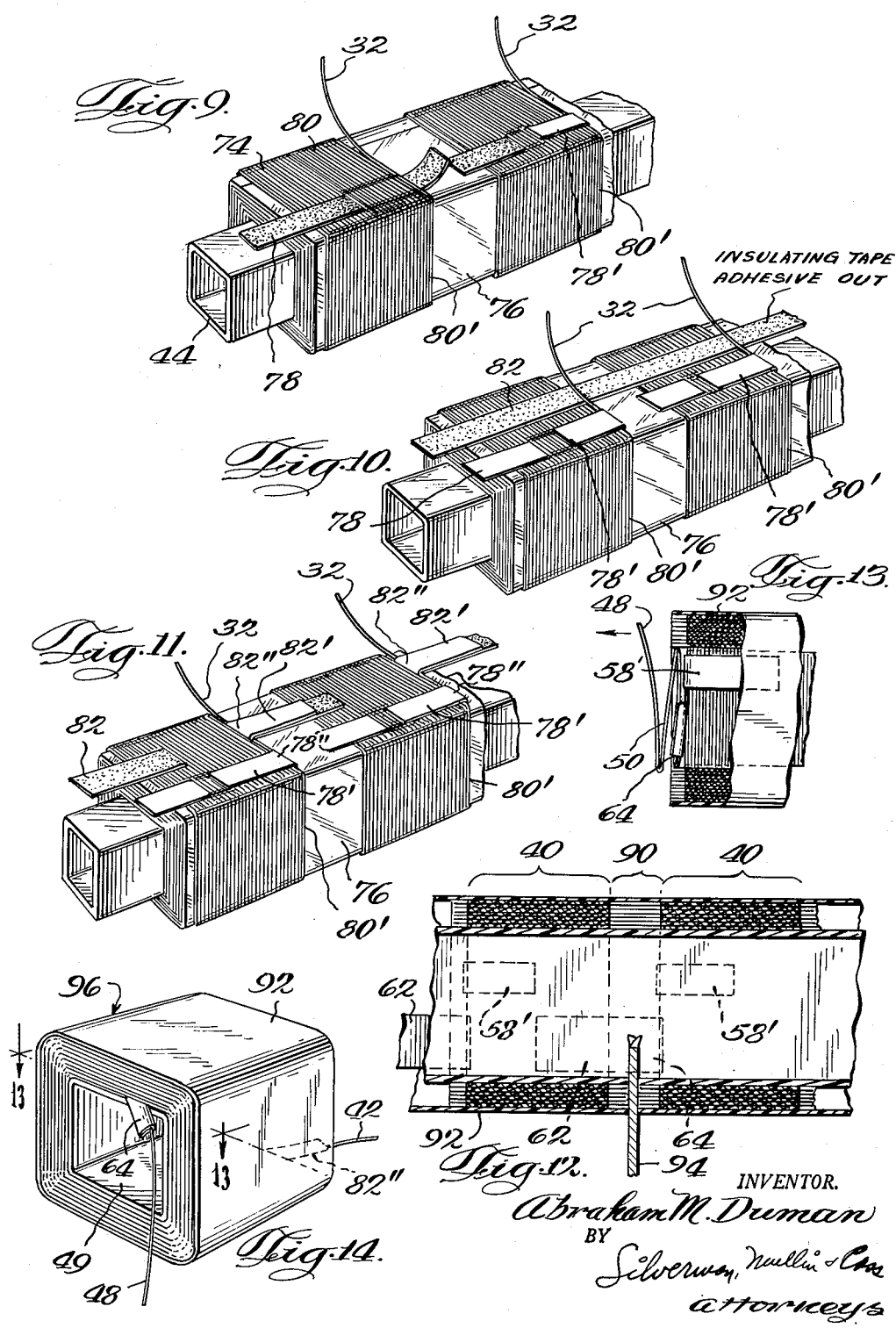

May 30, 1961
A. M. DUMAN
2,985,950
METHOD OF MANUFACTURING COILS
Filed Feb. 6, 1959
5 Sheets-Sheet 4
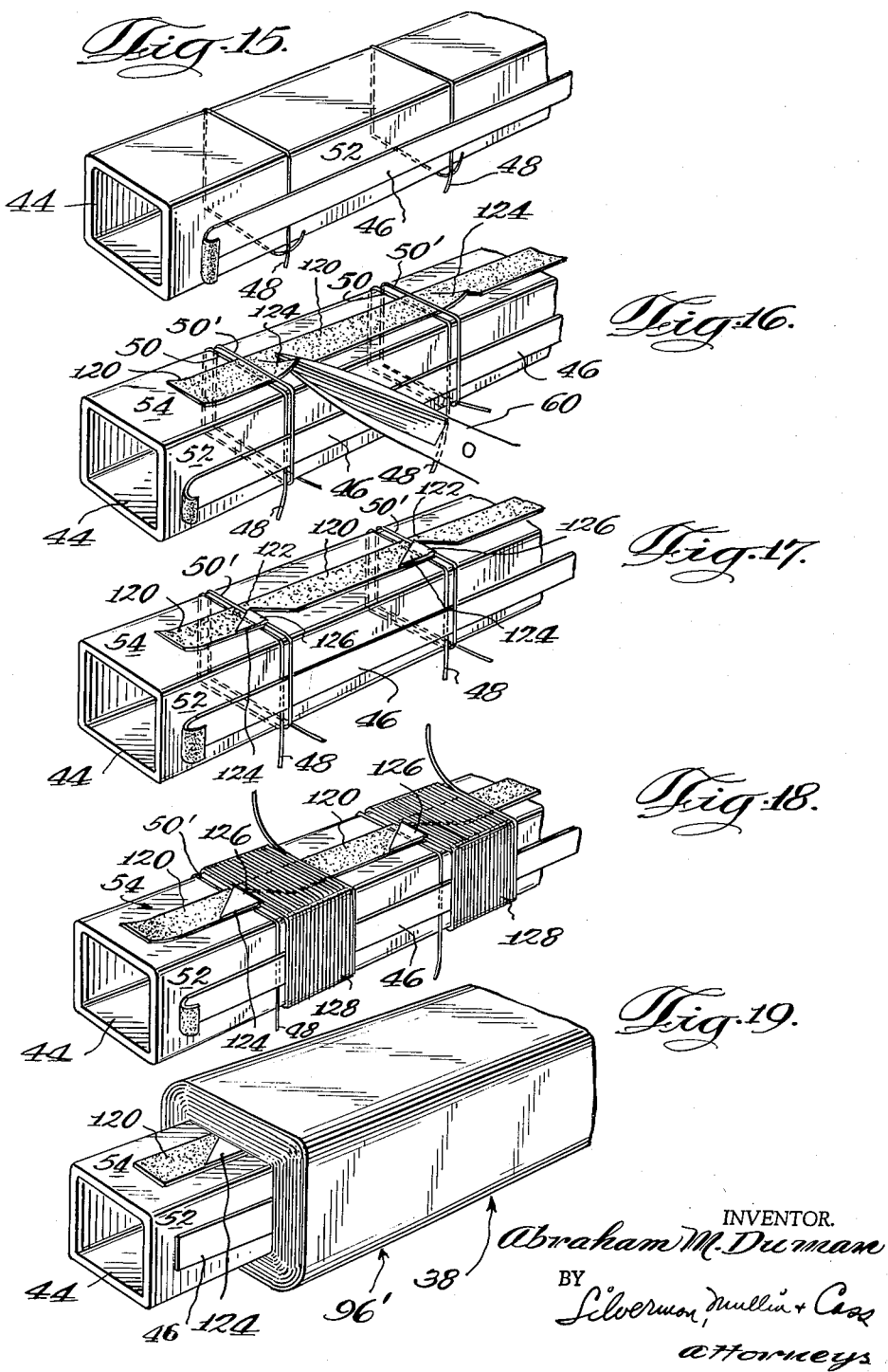
INVENTOR.
Abraham M. Duman
BY
Silverman, Mullin + Cass
Attorneys May 30, 1961 A. M. DUMAN 2,985,950
METHOD OF MANUFACTURING COILS
Filed Feb. 6, 1959 5 Sheets-Sheet 5
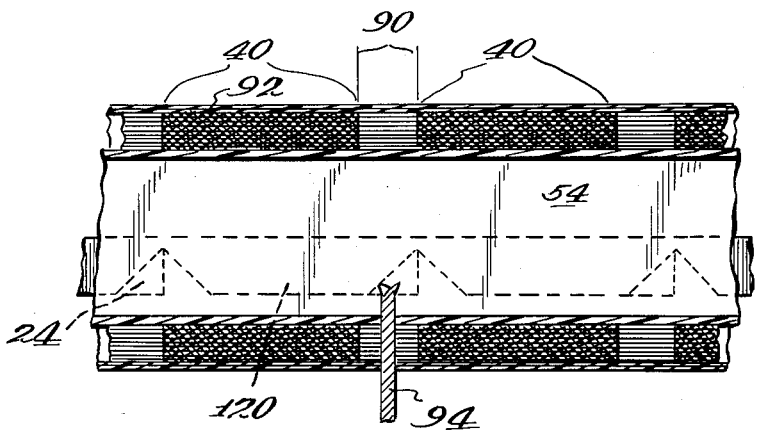
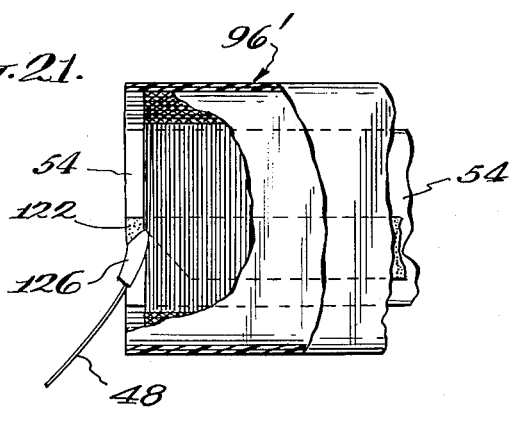
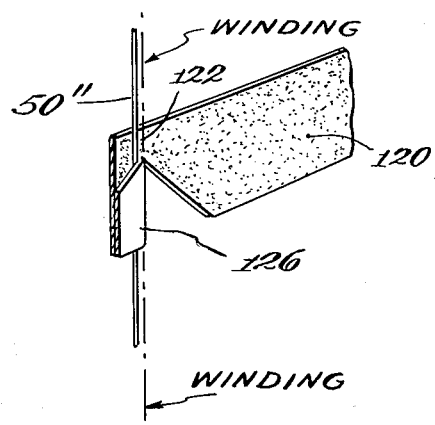
INVENTOR.
Abraham M. Duman
BY Silverman, Mullin + Cose
attorneys

United States Patent Office 2,985,950
Patented May 30, 1961

2,985,950
METHOD OF MANUFACTURING COILS

Abraham M. Duman, Highland Park, Ill., assignor to Advance Transformer Co., Chicago, Ill., a corporation of Illinois Filed Feb. 6, 1959, Ser. No. 791,687

8 Claims. (Cl. 29—155.57)

This invention relates generally to the art of manufacturing coils for electrical components, such as, chokes, transformers and inductors, and to the products resulting from such method, but more particularly, is concerned with a novel method of manufacturing such coils with insulated lead wires, and with the coils resulting from practice of said method.

The invention has primary applicability to the winding of coils upon so-called coil-winding machines, through the use of which a plurality of coils are wound simultaneously upon an elongate spindle or mandrel and thereafter separated into the individual coils by severing the same from one another. The most important problem solved is the manufacture of coils of relatively high voltage capacity with the lead wires from such coil completely insulated over the locations where said lead wires are likely to rub or be scraped, but on a high speed production basis.

Perhaps a short explanation of the present technique of winding such coils will be enlightening. A paperboard or fiberboard form of a square cross-section is slipped over a mandrel and the mandrel chucked into a lathe-like arrangement with a driven head-stock for rotating the mandrel. A plurality of spools of wire are mounted for readily paying out of their respective lengths of insulated copper wire through suitable guides which lay the wire onto the mandrel at a plurality of places and level-wind the wire as the mandrel rotates, so that the layers of wire are all simultaneously and automatically built up. The operator will lay a wire from each guide upon the form and apply a strip of adhesive tape along the entire length of the form to hold the first turn of each coil in place.

At this point, a strip of sheet insulating material such as fibre or acetate cellulose is usually applied to the new form and wrapped about the same, and a few turns of the wire are made by rotating the mandrel. These first few turns, which may be called the pull-out turns, eventually will be carefully pulled out of the end of each coil to form a terminal for the windings of the coil. To prevent the pulling out of more than the pull-out turns, anchoring means are provided at this point of the winding, and the operator of the machine resets the counter to commence from this point, since the pull-out turns will have no inductive effect on the completed article.

Anchoring means in the past have been formed by laying a strip of adhesive upon the mandrel along the length thereof with its adhesive side outward, and its dry side against the pull-out turns already taken. After this has been done, the winding continues until the operator is certain that the anchoring tape it itself quite securely attached by the second group of turns. As explained above, the counting of the total turns commences with this second group of turns which is to hold the anchoring tape in place. Usually from five to fifteen turns are taken, although this is not critical or important since the only criterion of securement at this point is whether the operator can readily fold the tape back upon the turns, i.e. upon itself with the second group of turns intervening, without the tape being pulled out from under. Since winding occurs under tension, even a few turns would probably be sufficient to hold the anchoring tape in place.

The second group of turns having been laid over the anchoring tape, the anchoring tape is now severed at a point spaced from the beginning of the second group of turns in a direction opposite the axial direction that the turns are being applied to the form, and the portion between the cut and the beginning of the second group of turns is folded upon itself and the second group of turns with the fold or crease disposed at the beginning of the second group of turns. Since this tape had been applied adhesive side out, it adheres to the turns and is further secured in place as additional layers of sheet insulation are applied thereto. After the turning back of the anchoring tape, the winding of the coil is completed. The final step is the securement of another anchoring tape to hold the opposite terminal lead of the coil. This is done in a similar way, except that the tape is applied at the end of the winding and after being turned back upon itself may be further anchored by means of another tape adhesive side down.

In this foregoing method which is in common use and forms no part of the invention, the complete form is sawed into its component coils, and the free ends of each coil are pulled out to form the terminal lead wires. Obviously, the wire can be pulled out only as far as is permitted by the anchoring tape which holds the first turn of the second group of turns in its fold, and the very last turn of the coil in its fold (a few final pull-out turns are applied after the final anchoring tape is applied). Thus, the lead wires are not insulated from the anchoring tape to their ends, but for their own enamel or varnish which is quite thin. In the case of high voltage coils, therefore, it has been customary to enwrap a strip of sheet insulating material about these terminal leads and attempt to manipulate this wrapping into the end of the coil to protect the wire where it passes out of the coil and over the edge of the form.

The great disadvantages of this procedure are well-known to those skilled in this art, since this has been a constant source of trouble in the coil-making art. The application of insulating material after the coils have been wound is time-consuming, slow, tedious and highly skilled work. Furthermore, the resulting coils are often faulty due to kinks and sharp bends placed in the leads while attempting to apply the insulating material and push the same into the coil end. Often such attempts result in internal wire breaks not easily detected until considerable further assembly work has been done. Scraped wire resulting may cause eventual break-down during service.

The invention herein completely obviates the need for application of insulating material after the coil has been finished. As such, it completely eliminates every disadvantage accompanying the manufacture of coils according to previously known techniques. The method described hereinafter is simple, fast, economical and above all provides a coil which has the insulation enwrapped about the lead wires for the critical length thereof as same pass out of the coil.

In the manufacture of the coils of this invention, after the coils have been cut from the completed form, the free wire ends are "fished" out of the ends of the coils and as the pull-out turns are unwrapped during this process the insulated portion of the wire is automatically pulled partially out of the coil end in perfect position for maximum insulation of the terminal wires of the coil. In addition, that portion of the insulating material which is exposed is permanently secured to the anchoring tape and cannot be pulled free or worked loose without tearing or forcibly severing the same from the anchoring tape.

Many other advantages will occur to those skilled in this art as a description of the method and variations thereof are set forth hereinafter in connection with which the illustrations show the details thereof. The objects of the invention are also only partially set forth above, since the achievements of the invention will be more manifest after examination of the specification, claims and drawings hereof, and hence will be more readily appreciated.

In the drawings the method of the invention has been illustrated in various forms and the resulting products illustrated but it is desired to emphasize that considerable variation can be made without in any way departing from the spirit or scope of the invention.

In these drawings:

Fig. 1 is a diagrammatic view showing the manner of starting the winding of the coils of the invention, one "stick" of coils upon a form having been completed and being removed from the winding machine.

Figs. 2, 3, 4, 5 and 6 are perspective views of a section of the form upon which the coils are being wound in accordance with the invention, to illustrate consecutive steps in the method of winding the first layer of wire to provide the desired anchoring when the coils are finished, as will be described.

Fig. 7 is a top plan view of a similar section of a form having coils wound thereon in which a step of a modified form of the method of the invention is illustrated.

Figs. 8, 9, 10 and 11 are views similar to those of Figs. 4 through 7 but showing the method of winding the last layer of wire to provide a coil whose terminal end is insulated according to the invention.

Fig. 12 is a sectional view taken through a "stick" of coils on a form and showing the manner in which the individual coils are severed by the use of a circular saw.

Fig. 13 is a fragmentary sectional view through the end of a coil constructed according to the invention using the novel method and showing how the end terminal wire is being pulled out and prevented from being pulled beyond the anchoring tape and has an insulating wrap on the free portion of the terminal wire end immediately adjacent the anchoring tape.

Fig. 14 is a perspective view of a completed coil of wire constructed according to the invention and using the novel method thereof from which the terminal ends have already been pulled.

Figs. 15, 16, 17, 18 and 19 are diagrammatic perspective views of a fragmentary portion of a form upon which the coils are being wound in accordance with a modified form of the invention, illustrating the consecutive steps in winding the first layer of wire to provide the desired anchor and insulating means for the inner terminal lead of the coil.

Fig. 20 is a fragmentary sectional view through the form of Figs. 15 to 19 which has been completed and is being sawed into its individual coils.

Fig. 21 is a fragmentary sectional view through a completed single coil of the stick of Fig. 20 and showing the manner in which the inner end terminal is being pulled out of the end of the coil.

Fig. 22 is a diagrammatic fragmentary sectional view of the anchoring tape of the coil of Fig. 21 shown disassociated from the winding in order to clearly illustrate the configurations and details of the combined anchoring and insulating structure thereof.

The invention is characterized as to its method by a sequence of steps, not necessarily limited to those described, which will enable the desired construction to be achieved without calling for any unusual, time-consuming, or difficult steps which cannot be performed by the ordinary worker skilled in the winding of coils by means of a conventional automatic coil winding machine. These steps include providing an insulating wrap of tape which will be partially formed during the coil winding process and completed when the coils of the stick or form individually cut apart to provide the necessary insulating wrap for the terminal ends of the coil. The resulting coil is not handled other than to draw the pullout turns out of the ends thereof, and the wrap so formed in the process of making the coil is automatically pulled out with the pull-out turns, and is in perfect position to insulate the terminal ends of the coil.

The several preferred methods of the invention result in several structures which may or may not provide securement between the insulating wrap and the anchoring or other tape in the coil itself, and as will become apparent, those structures in which there is such securement will have the advantage that it is practically impossible to pull or work the terminal insulating wrap out of the coil without tearing the wrap away from a tape that is permanently bound into the coil. The invention is considered as extending to these latter structures as well as to the method of forming the same.

Prior to entering upon the discussion of the details of the invention, it is desirable to point out several of the various steps of the technique of winding coils which are not basically different from the method of the invention. It is also desired to make several definitions which will assist in understanding of the description.

The modern coil for use in ballasts and chokes for ordinary lighting circuits will be connected into circuits which do not ordinarily use voltages beyond 1000 volts, and hence such coils are rarely wound manually, but are formed on automatic coil winding machines. These machines, as previously explained above, wind a number of coils on a form and the coils are later separated. The machines are well-known, and since they form no part of the invention, they are not illustrated, except very diagrammatically in Fig. 1. The mandrels for these machines are usually square in cross-section, and hence the forms which are telescopically engaged upon the mandrels are also of square tubular cross-section.

The forms normally used in the ballast industry are of cardboard or other paperboard material, and before laying the first layer of wire thereon, they are usually enwrapped with a long strip of insulating material such as fibre, synthetic cellulose sheeting or the like, the width of the strip being such that one or more turns of the mandrel must be taken to complete the wrap. The wire having been secured to the form by means of strips of adhesive tape will hold the first insulating wrap in place, as well as succeeding wraps. Incidentally, practically all coil winding of this type uses tapes which have pressure sensitive adhesive on one face thereof, and such tapes may be of paper, fabric, acetate cellulose or the like. In the case of coils which handle high voltages, obviously the insulating value of the tape which is eventually engaged about the end terminals of the coil should be taken into consideration. Where this insulating wrap is secured to the anchoring tape, mechanical strength is another factor to consider, and it is preferred that the tapes be made of fabric of high dielectric strength.

As the coils are wound, the layers are separated by one or more wraps of insulated sheeting such as paper, cloth, acetate cellulose or the like, and the simplest way of applying these separating layers is again by an elongate strip of width substantially greater than the circumference of the coils upon which it is applied and wrapped by the rotation of the mandrel, and which is held in place by the wires being simultaneously wound upon the work. This technique is also well-known, and because of the same the layers of paper or insulting sheeting between layers of wire extend throughout the length of the form.

When the winding has been completed, the entire group of coils is assembled upon the form, spaced apart along the length thereof, and the final layer or layers of insulating sheeting are applied. These may be several layers of insulating paper, fibre, acetate cellulose or the like, finishing off with an outer covering of strong kraft paper. This is marked with the identifying data of the particular coils. The stick of coils is a rigid member and is readily handled, being removed from the mandrel and sent to the department where the next process will take place.

The sticks are separated into their individual coils by the simple process of sawing them transversely with a circular saw. The saw table has suitable guides, jigs and the like to assure that the saw cuts will be made precisely between the coil ends, since obviously from the exterior of the stick this cannot readily be perceived in view of the final wrappings thereon.

After separation, the coils are sent to a department where each coil has its wire ends pulled out. The coil will have at least two ends, one of which is at the beginning of the windings, closest to the form, the latter being called the "inner" end hereinafter. The other end, which is at the completion of the winding will be called the "outer" end herein.

In constructing a ballast, these terminal ends will be electrically connected either to the terminals of other coils, to terminal strips or contacts mounted on the coil or other coils, or to lead wires extending from the ballast in which the coil is incorporated. Usually, the end terminals are scraped to bare the copper wire and are soldered to terminals mounted on terminal strips in the vicinity of the coil. As such, the end terminals are subject to mechanical manipulation which may weaken the insulation of the end terminal wires at the precise point where it is required that they be the strongest, namely where they come out of the coil ends. Recalling that the coils have been sawed apart, the ends of the physical coil may have the sharp edges of the form and the insulating sheeting between winding layers exposed, from which the emerging wires should be protected against abrasion. The invention herein is concerned with this protection.

In Fig. 1 there is illustrated a step in the winding of coils which is well-known, and is offered to assist in the understanding of the invention. Three spools of wire are diagrammatically illustrated at 30 with a fourth illustrated in broken lines at 30' to signify that there may be a great many more such spools. The wires from the respective spools are designated 32 and lead through reciprocating guides 34 over the rotary mandrel 36 to a stick 38 of coils which has just been completed and removed from the winding machine (not illustrated in any more detail). The stick 38 has the coils 40 wound thereon, and it will be seen that the outer terminal ends 42 of the stick extend therefrom having been disconnected from the wires 32. The start of the new stick is shown by the paperboard form 44 disposed on the mandrel 36 and having the wires 32 secured thereto by means of the first tacking strip 46. In the art this tacking strip 46 is often called an anchoring strip or anchor, but since the designation anchor or anchoring strip will be used herein to designate that tape or strip which limits the number of pull-out turns, the designation tacking strip will be applied to the tape 46. The purpose of the tacking strip 46 is merely to hold the wire ends 42 while the first turn or two is taken around the form 44, and this tape is applied with its adhesive-face against the form 44. When the inner terminal ends of the coils are pulled out, this tacking tape 46 is insufficient to oppose the release of the free end of the wire.

The broken line representations of wire 32', terminal end 42', and coil 40' are again illustrated to indicate that a large number of coils are wound simultaneously.

The stick 38 is formed of many layers of wire, paper, and the like, as generally indicated by the broken away right hand end thereof.

In Fig. 2 there is illustrated the paper tube 44 which is the form upon which the windings are laid, disassociated from its mandrel and the winding machine for the sake of clarity. As understood from the description of Fig. 1, the free end of the wire 32 has been laid upon the side of the form and taped to the form by the elongate tacking tape 46 which is applied adhesive face down. This free end of wire 32 is designated 48 to distinguish it from the end 42 from which it is severed before the second stick of coils is begun. One turn is made upon the form to provide a full pull-out turn, and this is designated 50. There may be several pull-out turns wound after the tacking strip 46 is applied, although only one is shown here. The tacking strip 46 is applied to one face 52 of the rectangular form 44 while the other tapes which presently will be described are applied to another face 54.

When as many pull-out turns have been applied as desired, depending upon the length desired for the inner end terminal of the resulting coil, this end terminal being formed by the wire end 48, a strip of insulating tape 56, adhesive side out, is applied to the face 54, adjacent one edge of said face to leave clearance for the next strip. This application is shown in Fig. 2, and is not difficult to accomplish since the tape 56 is held in place by the tension of the wires 32 emerging from the guides 34. Another strip of tape, usually narrower, than tape 56 comprising the anchoring tape 58 is then laid upon the face 54 parallel with the insulating tape 56, also adhesive side out, and under the strand of wire that overlies the insulating tape 56.

Now, before completing the next turn, and after at least a portion of the turn is made, the insulating tape 56 is cut to the right of the turn being taken. This turn is designated 50' and a portion of it will be pulled out while the remainder will be a permanent part of the coil being formed because of the anchoring strip 58. This cut is shown in Fig. 4 being made at the right with a scissors 60 and the cut is spaced from the beginning of each coil in the axial direction that the coil is being wound. In other words, the coils of the stick being formed according to our description, start out by being wound to the right in Figs. 1 to 6, and hence the cut is made to the right of the beginning of the coil. If the winding were commenced moving to the left, the cut would be made to the left.

In Fig. 4, at the left hand end, the cut has been made in the insulating strip 56, and the resulting free end 56' is being turned back upon itself to cross the same over the turn 50'. In the center of Fig. 4, this has been almost completed, and the free end is designated 56" and is shown about to be pressed down against the segment of the tape 56 which remained from the severing of the left hand portion 56'.

After all of the severed segments have been folded back upon the remainders of the insulating tape 56, the resulting formations are as shown in Figs. 5 and 6, comprising face-to-face folded members of insulating tape with a single wire comprising a portion of the turn 50' at the hold at the fold. These folded back sections may be generally designated 62 (Fig. 5), although it should be appreciated that they are formed of parts of the original tape 56. The folds are designated 64.

After all folded-back sections 62 have been formed, the form 44 is rotated on its mandrel and a group of turns are applied which commence the winding of the coil proper. This group of turns is designated 66 and overlies a substantial portion of the anchoring tape 58, which it will be recalled, lies with its adhesive face out and was not involved in the formation of the folded-back sections 62. As many as twenty turns may be taken to firmly secure the tape 58 to the face 54. This is shown in Fig. 5, and it will be observed in this figure that after the group of turns 66 has been wound, the anchoring tape 58 is also cut, but on the opposite side of the turns 66. Actually, it is not too important where the anchoring tape is cut, so long as there is a sufficient length of tape such as at 58' which can be folded over the group of turns 66 upon itself and have sufficient overlap on the right hand side so that when the winding is continued there will be a sufficient number of turns covering the top of the length of tape 58 to secure the tape firmly in place. This latter step is shown in Fig. 6.

The second group of turns 68 (Fig. 6) which follows the group 66 is also a part of the first layer of turns but it covers the free end of the folded section 58' of each of the sections of tape 58 that have been cut and turned back. The folds of the turned-back sections 58' are designated 70 and it will be appreciated that a portion of the turn 50' is also engaged in this fold for each coil, but since the folded-back sections 58' are now all firmly secured in place, comprising anchoring means, when the turn 50 and the turn 50' are pulled out upon completion of the coil and severance from the stick, the only portion of the turn 50' which will be pulled out will be that portion up to the fold 70.

Thereafter, the winding of the coils continues. The turns are continually laid side by side along the form 44 until the predetermined length of the coils formed has been reached, which may be the place marked with the broken lines 72 in Fig. 6. In the course of so doing, it will be apparent that the left hand ends of the folded-back sections 62 probably will be covered with a group of turns which is not material, but merely presses the halves of the sections 62 more firmly face to face.

The guides 34 at this point will lead the wire 32 back in a left hand direction so that the second layer of turns can be applied directly upon the first layer, but in an opposite direction. Before the second layer of turns is applied, the operator will wrap one or more layers of insulating material, such as paper, upon the first layer which is a technique well-known in the coil winding art. In Fig. 8, there is illustrated a fragment of the form 44 having coils wound thereon in which the last layer 74 of wire is being applied. It will be seen that the wire 32 is being applied by the winding machine upon a layer of paper or sheet material 76. None of the anchoring sections 58' or the insulating folded-back sections 62 can be seen because all are, by now, buried under layers of turns and insulating materials.

In Fig. 8, just before the last group of turns is applied, an anchoring tape 78 is laid upon the almost completed coils, adhesive side out, and the winding continued on top of the tape 78. This group of coils is being finished with the last or top layer 74 being wound in a direction moving axially to the right. The broken away portion of Fig. 8 shows the generally layered structure.

In Fig. 9, the winding has been completed with the last group of turns 80 covering a section of the anchoring tape 78. As soon as the last turn has been made, the tape 78 is cut to the right of the last turn 80' and the resulting free ends are folded back upon themselves to form anchoring means at 78' lying upon the last layer of turns as seen in Fig. 10.

The purpose of the anchoring means 78' at the end of the termination of the winding is to prevent any turns beyond the anchoring means to be pulled out when the pull-out turns are moved.

Adjacent to the tape 78, either after the formation of the anchoring means 78' or before, an insulating tape 82 is applied also adhesive face out. The turn 80' is continued over the tape 82 so that when the insulating fold presently to be described is formed, the last turn 80' passes from the fold 78'' of the anchoring means 78' directly to the insulating fold. The insulating tape 82 is cut to the left of the turn 80' and folded over to the right upon itself to form the folded-over section 82' with the turn 80' continued through the fold 82''. The functions of the anchoring means 78' and the folded over section 82' are the same respectively as the functions of the anchoring means 58' and the folded-over sections 62 for the beginning of the winding of the coil.

The winding of the coils is now completed, but for the finishing off process. After the insulating sections 82' have been formed, several turns may be taken to provide the pull-out turns. These of course will lie upon the section 82' adjacent the folds 82'' but not adhered thereto because the adhesive is on the interior of the sections 82'. Thereafter, a tacking strip may be applied to hold the pull-out turns in place, but since the wires are held in tension, this is not necessary and is usually not done. The final insulation layer is then applied and several layers of kraft paper 92 may be wrapped about the finished stick 38. The protruding ends 42 will form the outer end terminals of the coils.

The stick is now removed and the coils are separated by sawing, as shown in Fig. 12. It may be assumed that the folded-over sections illustrated in dotted lines in Fig. 12 are 62 and 58'. Two coils of a stick are illustrated before separation, and the windings of the coils occupy the spaces along the stick designated by the characters 40, separated by the lesser spaces one of which is shown at 90. The space 90 is devoid of wire, and is formed of the layers of paper, insulating sheeting, the form 44 and the covering 92. The stick is placed upon a bench and sawed through the space 90 by a circular saw 94, which, as will be seen does not affect the anchoring means 58' but cuts away practically all of the section 62 from the fold 64, leaving the fold as a short sheath over the portion of the pull-out turns closest to the anchoring means 58'.

In Fig. 13, the end of the coil is shown as the pull-out turn or turns 50 are being pulled out of the coil. As this occurs, the sheath or fold 64 is also pulled out, but of course cannot come out very far because it is directly alongside the anchor means 58'. The resulting free end 48 becomes the inner terminal end of the coil 96 (Fig. 14), and the insulating fold 64 extends from the interior end of the lead 48 out of the end of the coil clearing the said end and thus providing a mechanical and electrical insulation for the lead wire 48. The other end of the coil 96 is also provided with an end terminal 42 which is the outer one, and its insulating member is the fold 82'' pulled out of the end. Obviously, when the coils are sawed apart, one inner end terminal and one outer end terminal will be provided on the opposite ends of the separated coils, and folds or sheaths will be separated from their respected folded-over sections.

From the description, it will be apparent that in the method described, the resulting coil will have no connection between its sheaths 64 and 82'' and the anchoring means adjacent the same, namely 58' and 78. This is substantially the condition that exists in coils formed by manually engaging a piece of insulation material on the end terminals and attempting to force the member along the end terminal wire into the coil as far as possible to protect the wire at the location where it emerges from the coil. It would be much more desirable to connect the two members.

Thus in Fig. 7, prior to covering the first layer of wire of the structure shown in Fig. 6, a third strip 100 of tape, adhesive-face down, is applied to the form overlapping both the folded-back sections 58' and 62. When the coils are sawed apart there will be a narrow strip of the tape 100 connecting each section 62 with its closest anchoring means 58'. This will provide additional strength to prevent the fold or sheath 64 from being inadvertently pulled or worked out of the coil.

A similar connecting tape (not shown) may be applied to the stick at the end of the winding process, such as when the same is in the condition shown in Fig. 11, with the tape overlapping both the anchor means 82' and 78'.

In Figs. 15 through 22 there are illustrated steps in the method of producing similar coils which provides a connection between the sheath or fold of the end terminal and the anchoring member but uses only a single tape for all three functions: anchoring, insulating and connecting.

In Fig. 15, there is illustrated a tubular form upon which the coils are to be wound in the same manner as the form 44 of Fig. 1. The tacking strip 46 is applied to a face 52 to hold the wire ends 48 to the form and one turn 50 is wound around the form. A layer of insulating material such as paper or cellulose acetate may have been enwrapped about the form along with the first turn or two. After the first turn 50 is taken (and perhaps one or two more depending upon how long it is desired to have eventual inner end terminal 48), a strip 120 of insulating tape is applied to the side 54 adhesive-face out. The wire is then wound about the form one more turn as at 50' and over the tape 120 to begin the actual turns of the coil.

As shown in Fig. 16, the tape is now cut on the right hand side of the turn 50', that is starting on the side which is axially in the direction of the winding, on an angle toward the turn 50', thereby cutting a slanted cut which does not pass completely across the tape but leaves a substantial imperforate part 122 (see Fig. 22) thereat. As shown in Fig. 17, the triangular flap 124 provided thereby is folded to the left upon itself to engage the wire of the turn 50' within the fold 126.

After this has been done, the winding continues as shown in Fig. 18, laying the turns 128 upon the strip 120. The remaining turns and layers are applied in conventional manner until the entire stick 38 of coils has been wound. The completion of the coils may have the same anchoring and insulating structure applied thereto for the outer end terminal, and hence only the inner and terminal structure will be described as to this method.

In Fig. 20, the manner of sawing the coils apart is shown. The saw 94 enters the space 90 between the coils 40 and in the process cuts away the outer portion of the triangular folded-over part 124, leaving only the fold 126. Since the turns have been wound upon the remainder of the tape 120, it serves as an anchoring means, because the fold 126 is connected to the body of the tape 120 by the connecting part 122. There is no need for a wrap being taken about the upper portion of the turn 50' lying on the tape 120 because the connecting part 122 takes all of the strain.

In Fig. 21, the end terminal 48 has been pulled out of the coil 96' partially pulling out the fold 126 which protects the wire at the point it emerges from the coil.

Fig. 22 is a view showing in enlarged perspective, the end of the tape 120 after the triangular portion 124 has been cut through. The sheath or fold 126 has been formed about the turn 50" and this sheath is connected to the body of the tape 120 by the connection 122, giving the functions of anchoring means, connecting means, and insulating means.

Considerable variations are possible both as to the method and as to the structures of invention. For example, instead of using a conventional scissors such as shown at 60 in Figs. 4 and 16, a surgical scissors having a laterally curved bill has been used in cutting the tape 120 to provide the triangular portion 124. Different widths of tape, combinations of sizes, and the like have been used with success. It is desired to cover the invention in its broadest aspect commensurate with the advance made in the arts and sciences.

What it is desired to claim is:

1. In the method of manufacturing elongate wire coils which includes winding a plurality of coils simultaneously upon an elongate tubular form, sawing the coils apart, and pulling the end terminals out of the coils, the process of providing an insulating sheath on at least one end terminal at the point where same emerges from said coil which comprises; winding at least one pull-out turn for each coil on a form, placing a strip of insulating material along the length of the form having an adhesive face outward and laying the first effective turn of wire upon said adhesive strip and thereafter, at least partially severing said strip to provide a foldable portion alongside said first effective turn opposite said pull-out turn, folding the foldable portion over the said effective turn to engage same in said fold and adhering said foldable portion in said folded over condition to provide said sheath, anchoring that portion of said first effective turn following the part thereof engaged in said fold, and completing pulling out the pull-out turn with said effective turn so engaged in the sheath at said point of emergence after the winding of the coil upon said strip.

2. A method as claimed in claimed 1 in which said anchoring is accomplished by applying a second strip of material alongside said first mentioned strip and under said first effective turn, winding several turns upon said strip, severing said second strip at a point spaced opposite the axial direction of winding, folding over the severed portion so that at least a part thereof lies in the path of further winding while engaging said first effective turn in a similar fold but extending in a direction opposite the first fold, and continuing the winding of the coil.

3. A method of making coils of electrical wire and providing each coil with at least one end terminal that has an insulating sheath thereon at the point where said one end terminal emerges from the coil end which comprises, winding at least one pull-out turn on an elongate tubular form for each of a plurality of coils to be wound upon said form, applying an insulating tape having a self-adhesive face to said form along the length thereof with the self-adhesive face outward, winding the next turn upon said tape, cutting the tape at points each spaced from said next turn, folding the portion between each said cut and said next turn over said next turn in a direction opposite the axial direction in which the winding is occurring, anchoring said next turn, completing the winding of the coils, cutting said coils from one another along lines between coils clearing the folds, and pulling the pull-out turns out of the separated coils as far as permitted.

4. In the method of making coils of wire which includes winding a plurality of coils upon an elongate tubular form, cutting the coils apart, and pulling the first and last applied pull-out windings from the coil ends to serve as end terminals, the method for applying a sheath of insulating material to one of said end terminals at the point where same emerges from said coil which comprises: laying a strip of insulating tape having a self-adhesive face upon said form along the length thereof under one of the first and last effective turns of each coil thereof, cutting said tape to provide a flap which extends inwardly of the end of each said coil, folding the flap over said one turn outwardly of the end of the coil, completing the winding of said coil, and severing all of said folded over flaps but said folds while cutting said coils apart whereby when the pull-out winding connected with each said fold is pulled out of the end of a said coil, the fold will be partially pulled out, said one turn of said coil having been anchored to prevent said fold from being pulled out completely.

5. A method of making coils as claimed in claim 2 in which a connecting member comprising a length of tape is adhered between said first and second folds before completing the winding of said coil.

6. A method of winding coils which comprises starting a plurality of coils upon an elongate form with the coils adapted to be spaced along the length of the form by taking at least one pull-out turn around the form for each coil, applying an elongate tape of insulating material along the length of said form overlying the pull-out turns, and the tape having a self-adhesive face outward, winding a next turn over the tape, forming a flap in said tape extending axially inward of each coil being formed without severing the tape and with the hinge of the flap at the said next turn, folding each flap upon each said turn in a direction extending axially away from the coil being formed, and continuing with the winding of the coils in the conventional manner.

7. A method as claimed in claim 6 in which a similar tape is applied under the last turn of each coil, a similar flap is formed in each of said similar tapes, and the flaps are similarly folded upon each of said last turns, after which winding of the coils is finished.

8. In the method of making coils upon elongate forms, means for forming an insulating sheath on at least one end terminal of said coils which comprises, applying an adhesive strip upon said form along the length thereof under each of one of the end turns of the said coils, cutting and folding the strip and adhering same in a fold with said one end turn engaged therein which can be partially pulled out of the coil end after the coils are severed from said form so that said fold will provide a sheath for said end turn at the point of emergence thereof from the coil, said end turn being anchored to prevent its being pulled out completely with said fold.

References Cited in the file of this patent

UNITED STATES PATENTS

| | | |
|---|---|---|
| 1,836,948 | Anderson | Dec. 15, 1931 |
| 2,166,841 | Helgason et al. | July 18, 1939 |
| 2,787,769 | Hill et al. | Apr. 2, 1957 |
| 2,795,765 | Stroble | June 11, 1957 |
| 2,807,869 | Rice | Oct. 1, 1957 |
| 2,865,086 | Whipple | Dec. 23, 1958 |
| 2,883,635 | Clark | Apr. 21, 1959 |